United States Patent
Hirota

(10) Patent No.: US 11,566,660 B2
(45) Date of Patent: Jan. 31, 2023

(54) BALL JOINT AND DUST COVER

(71) Applicant: NOK CORPORATION, Tokyo (JP)

(72) Inventor: Takuma Hirota, Shizuoka (JP)

(73) Assignee: NOK CORPORATION, Tokyo (JP)

( * ) Notice: Subject to any disclaimer, the term of this patent is extended or adjusted under 35 U.S.C. 154(b) by 416 days.

(21) Appl. No.: 16/647,997

(22) PCT Filed: Aug. 7, 2018

(86) PCT No.: PCT/JP2018/029579
§ 371 (c)(1),
(2) Date: Mar. 17, 2020

(87) PCT Pub. No.: WO2019/058796
PCT Pub. Date: Mar. 28, 2019

(65) Prior Publication Data
US 2020/0284290 A1    Sep. 10, 2020

(30) Foreign Application Priority Data
Sep. 19, 2017    (JP) .............................. JP2017-179358

(51) Int. Cl.
*F16C 11/06* (2006.01)
*F16J 15/52* (2006.01)
*F16J 3/04* (2006.01)

(52) U.S. Cl.
CPC ................. *F16C 11/06* (2013.01); *F16J 3/04* (2013.01); *F16J 15/52* (2013.01)

(58) Field of Classification Search
CPC ..... F16C 11/06; F16J 3/04; F16J 3/041; F16J 3/048; F16J 15/52
See application file for complete search history.

(56) References Cited

U.S. PATENT DOCUMENTS 3,472,540 A * 10/1969 Gottschald ............. B60G 7/005
277/504
2007/0065057 A1    3/2007 Smith et al.

FOREIGN PATENT DOCUMENTS

DE    102011004496    8/2012
EP    1 096 161    5/2001
(Continued)

OTHER PUBLICATIONS

International Search Report issued in International Patent Application No. PCT/JP2018/029579, dated Oct. 16, 2018, along with an English translation thereof.

(Continued)

*Primary Examiner* — Gilbert Y Lee
(74) *Attorney, Agent, or Firm* — Greenblum & Bernstein, P.L.C.

(57) ABSTRACT

Provided are a ball joint and a dust cover that make it possible to suppress contact of a body portion of the dust cover with the vicinity of a flange portion of a ball stud. A dust cover integrally includes: a deformable bellows-shaped body portion made of an elastic body; a fixed portion made of an elastic body and provided on one end side of the body portion; and a sealing portion made of an elastic body and provided on the other end side of the body portion. The sealing portion includes: an inner peripheral sealing portion configured to be slidable on a part of a shank portion on the opposite side of the shank portion from a spherical portion with respect to a flange portion; and a cover portion that continuously covers, in an outer wall surface of the flange portion, a radially outward tip end portion and a part of a portion that decreases in diameter from the tip end portion toward the spherical portion side.

5 Claims, 3 Drawing Sheets

(56) References Cited

FOREIGN PATENT DOCUMENTS

| FR | 2468044 A | * | 5/1981 | .......... F16C 11/0671 |
|---|---|---|---|---|
| GB | 494650 A | | 10/1938 | |
| GB | 1583673 A | * | 1/1981 | .......... F16C 11/0671 |
| JP | S62-83512 A | | 4/1987 | |
| JP | H05-22834 U | | 3/1993 | |
| JP | 2006-522293 | | 9/2006 | |
| JP | 2008-544182 A | | 12/2008 | |
| JP | 2012-21600 | | 2/2012 | |
| JP | 2012-102840 A | | 5/2012 | |
| WO | WO-2020075558 A1 | * | 4/2020 | .......... F16C 11/0604 |

OTHER PUBLICATIONS

International Preliminary Report on Patentability issued in International Patent Application No. PCT/JP2018/029579, dated Mar. 24, 2020, along with an English translation thereof.

* cited by examiner

BALL JOINT AND DUST COVER

TECHNICAL FIELD

The present invention relates to a ball joint and a dust cover that are mounted in various devices such as a vehicle.

BACKGROUND ART

Conventionally, in a ball joint that is mounted in various devices such as a vehicle, a dust cover is provided to prevent water, dust, and so on from entering a joint portion and to prevent grease from flowing out of the joint portion. Referring to FIGS. 4 to 6, a ball joint and a dust cover according to a conventional example will be described. FIG. 4 is a schematic sectional view of the ball joint according to the conventional example. FIG. 5 is a schematic sectional view of the dust cover according to the conventional example. FIG. 6 is a schematic sectional view illustrating a state of the main part of the ball joint when a ball stud swings, according to the conventional example.

The ball joint according to the conventional example includes a ball stud 100 including a spherical portion 110 at one end of a shank portion 120 having a flange portion 140, a socket 200 having a bearing 220 for the spherical portion 110 and supporting the ball stud 100 in such a way as to allow the ball stud 100 to rotate and swing, and a knuckle 300 joined to the shank portion 120. A dust cover 700 integrally includes a deformable bellows-shaped body portion 710 made of an elastic body, a fixed portion 720 made of the elastic body and fixed to the socket 200, and a sealing portion 730 made of the elastic body and provided to be slidable relative to the shank portion 120.

With the ball joint configured as described above, when the ball stud 100 rotates relative to the socket 200 in a direction of arrow R in the figure, the sealing portion 730 slides relative to the shank portion 120 of the ball stud 100 so that the sealing performance is maintained. When the ball stud 100 swings relative to the socket 200 in a direction P in the figure, the body portion 710 of the dust cover 700 deforms so that the sealing performance is maintained.

Herein, a technique in which a body portion is configured to expand outward is also known for a dust cover for use in a ball joint. However, with this technique, there are cases where, in a device mounted with the ball joint, the outer diameter of the body portion cannot be increased for preventing the body portion from contacting other members. Consequently, there are cases where the amount of deformation of the body portion is limited so that it is not possible to fully respond to a swinging motion of the ball stud. On the other hand, by employing the bellows-shaped body portion 710 as described above, it is possible to increase the amount of deformation of the body portion 710 without increasing the outer diameter of the body portion 710 so much.

However, in the case where the bellows-shaped body portion 710 is employed, a problem may arise that the body portion 710 comes in contact with the ball stud 100 when the body portion 710 deforms. This point will be described with reference particularly to FIG. 6. In the illustrated conventional example, the body portion 710 integrally includes a first mountain portion 711 protruding radially outward on the fixed portion 720 side, a second mountain portion 712 protruding radially outward on the sealing portion 730 side, and a valley portion 713 provided between these mountain portions and recessed radially inward. For example, as illustrated in FIG. 6, when the ball stud 100 is tilted to incline to the left side in the figure, the body portion 710 deforms so that the left side in the figure is compressed and the right side in the figure is extended. Consequently, on the left side in the figure, the first mountain portion 711 and the second mountain portion 712 of the body portion 710 may come in contact with each other, and a tip end of the valley portion 713 of the body portion 710 may come in contact with the vicinity of the flange portion 140 (see a portion indicated by arrow X in the figure).

In this way, when the motion of part of the body portion 710 to contact the vicinity of the flange portion 140 of the ball stud 100 is repeated, there is a possibility that the body portion 710 degrades over time, leading to breakage. Therefore, contact of part of the body portion 710 with the vicinity of the flange portion 140 of the ball stud 100 causes a reduction in the durability of the dust cover 700.

PRIOR ART DOCUMENT

Patent Document

Patent Document 1: Japanese Unexamined Patent Application Publication (Translation of PCT Application) No. 2008-544182

Patent Document 2: Japanese Unexamined Patent Application Publication No. 2012-102840

SUMMARY OF INVENTION

Problem to be Solved by the Invention

An object of the present invention is to provide a ball joint and a dust cover that make it possible to suppress contact of a body portion of the dust cover with the vicinity of a flange portion of a ball stud.

Means for Solving the Problem

In order to solve the problem described above, the present invention employs the following means.

Specifically, a ball joint of the present invention is a ball joint including:

a ball stud including a spherical portion at one end of a shank portion having a flange portion;

a socket having a bearing for the spherical portion and supporting the ball stud in such a way as to allow the ball stud to rotate and swing;

a joint member joined to the shank portion on an opposite side of the shank portion from the spherical portion with respect to the flange portion; and a dust cover integrally including a deformable bellows-shaped body portion made of an elastic body, a fixed portion made of an elastic body, the fixed portion provided on one end side of the body portion and fixed to the socket, and a sealing portion made of an elastic body and provided on the other end side of the body portion, the sealing portion configured to be slidable relative to the shank portion, wherein the sealing portion includes:

an inner peripheral sealing portion configured to be slidable on a part of the shank portion on the opposite side of the shank portion from the spherical portion with respect to the flange portion; and a cover portion that continuously covers, in an outer wall surface of the flange portion, a radially outward tip end portion and a part of a portion that decreases in diameter from the tip end portion toward the spherical portion side.

A dust cover of the present invention is a dust cover for use in a ball joint, the ball joint including: a ball stud including a spherical portion at one end of a shank portion having a flange portion; a socket having a bearing for the spherical portion and supporting the ball stud in such a way as to allow the ball stud to rotate and swing; and a joint member joined to the shank portion on an opposite side of the shank portion from the spherical portion with respect to the flange portion, the dust cover integrally including:

a deformable bellows-shaped body portion made of an elastic body;

a fixed portion made of an elastic body, the fixed portion provided on one end side of the body portion and fixed to the socket; and a sealing portion made of an elastic body and provided on the other end side of the body portion, the sealing portion configured to be slidable relative to the shank portion, wherein the sealing portion includes:

an inner peripheral sealing portion configured to be slidable on a part of the shank portion on the opposite side of the shank portion from the spherical portion with respect to the flange portion; and a cover portion that continuously covers, in an outer wall surface of the flange portion, a radially outward tip end portion and a part of a portion that decreases in diameter from the tip end portion toward the spherical portion side.

According to the present invention, the radially outward tip end portion of the flange portion of the ball stud and a part of its portion that decreases in diameter from the tip end portion toward the spherical portion side are continuously covered by the cover portion provided to the sealing portion of the dust cover. Therefore, even when the ball stud swings so that the body portion of the dust cover is deformed, it is possible to suppress contact of the body portion with the vicinity of the flange portion of the ball stud.

The part of the shank portion on the opposite side of the shank portion from the spherical portion with respect to the flange portion may be formed by an annular groove having an arc-shaped section and continuously provided from the flange portion, and the inner peripheral sealing portion may be in close contact with and slidable relative to the entire annular groove.

Effect of the Invention

As described above, according to the present invention, it is possible to suppress contact of the body portion of the dust cover with the vicinity of the flange portion of the ball stud.

DESCRIPTION OF EMBODIMENTS

Figure 1:
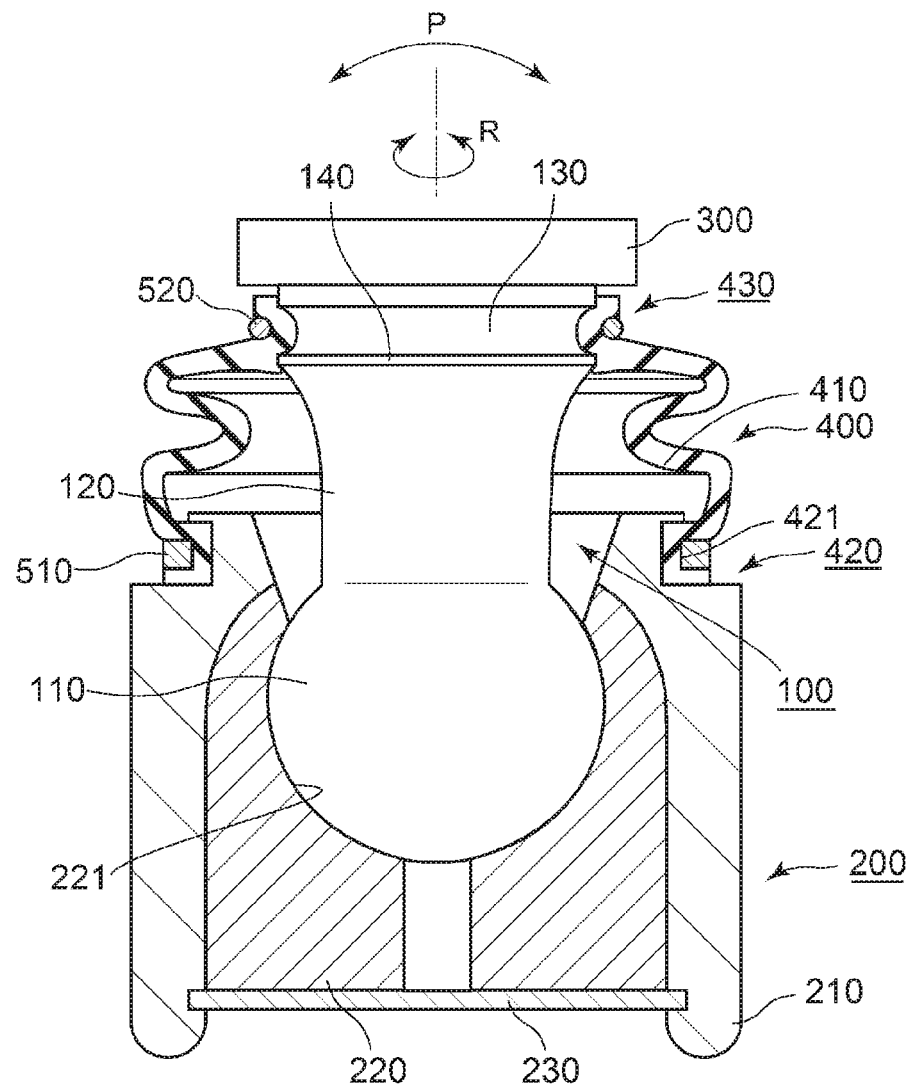
FIG. 1 is a schematic sectional view of a ball joint according to an embodiment of the present invention.

Referring to the drawings, a mode for carrying out the present invention will be illustratively described in detail below based on an embodiment. However, unless specifically stated otherwise, it is not intended to limit the scope of the present invention to the dimensions, materials, shapes, relative arrangements, and so on of constituent components described in the embodiment.

Embodiment

Figure 2:
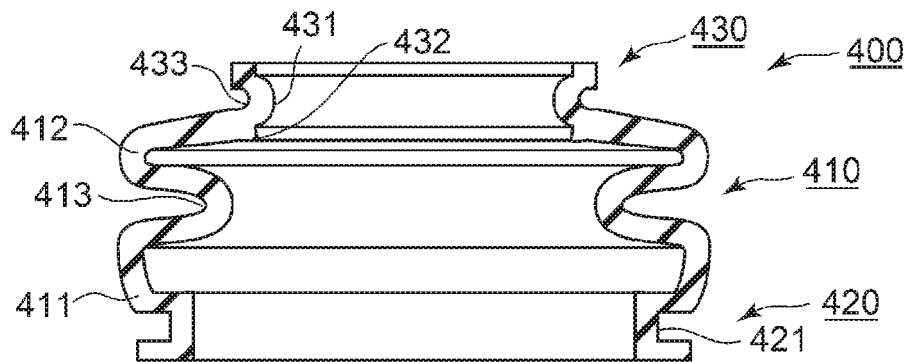
FIG. 2 is a schematic sectional view of a dust cover according to the embodiment of the present invention.
Figure 3:
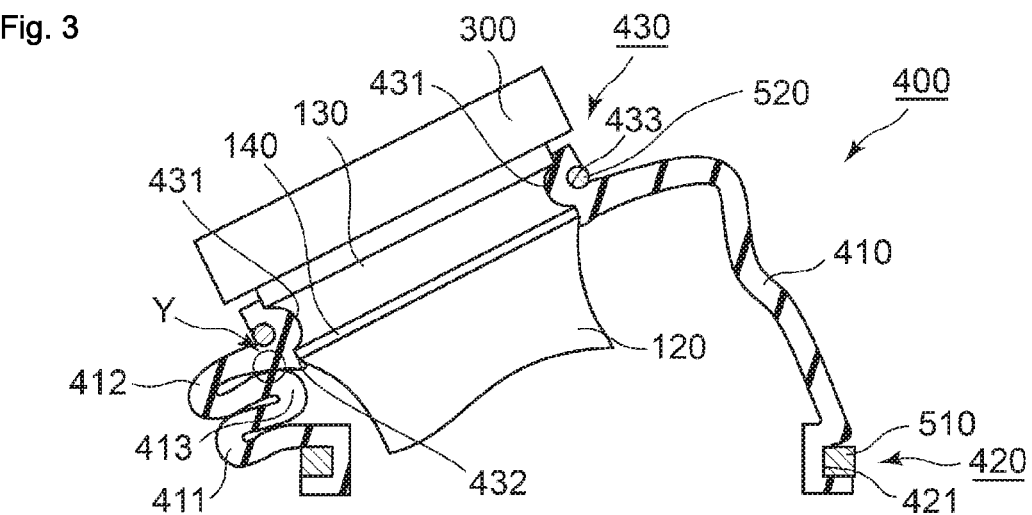
FIG. 3 is a schematic sectional view illustrating a state of the main part of the ball joint when a ball stud swings, according to the embodiment of the present invention.
Figure 4:
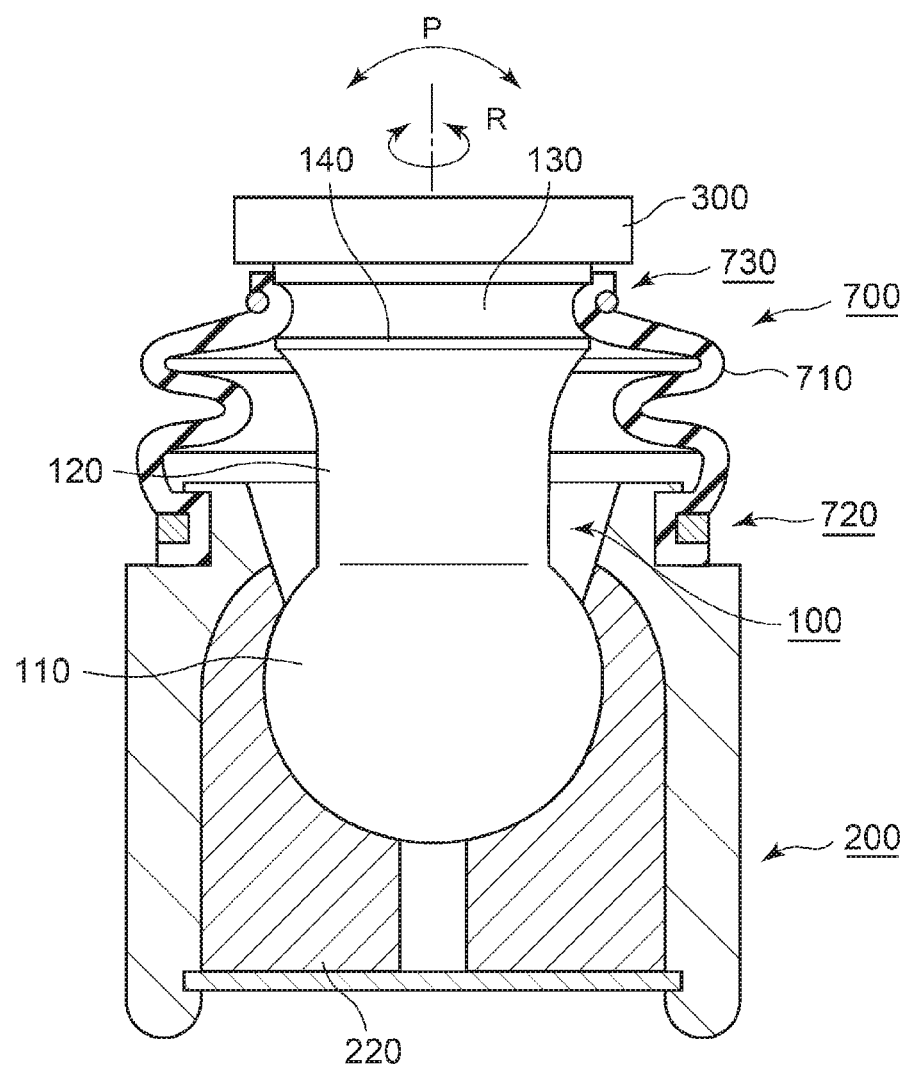
FIG. 4 is a schematic sectional view of a ball joint according to a conventional example.
Figure 5:
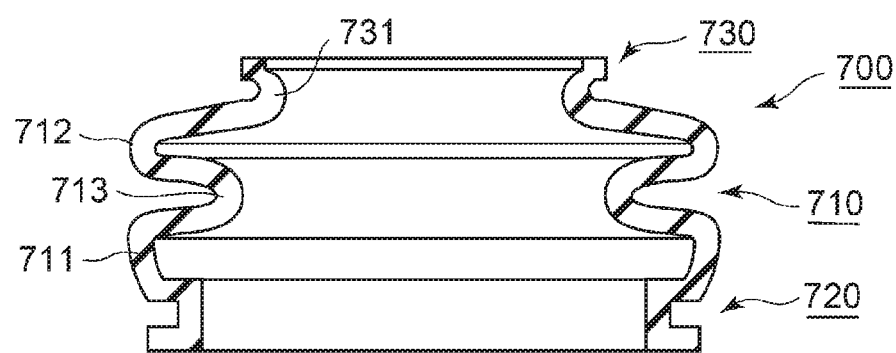
FIG. 5 is a schematic sectional view of a dust cover according to the conventional example.
Figure 6:
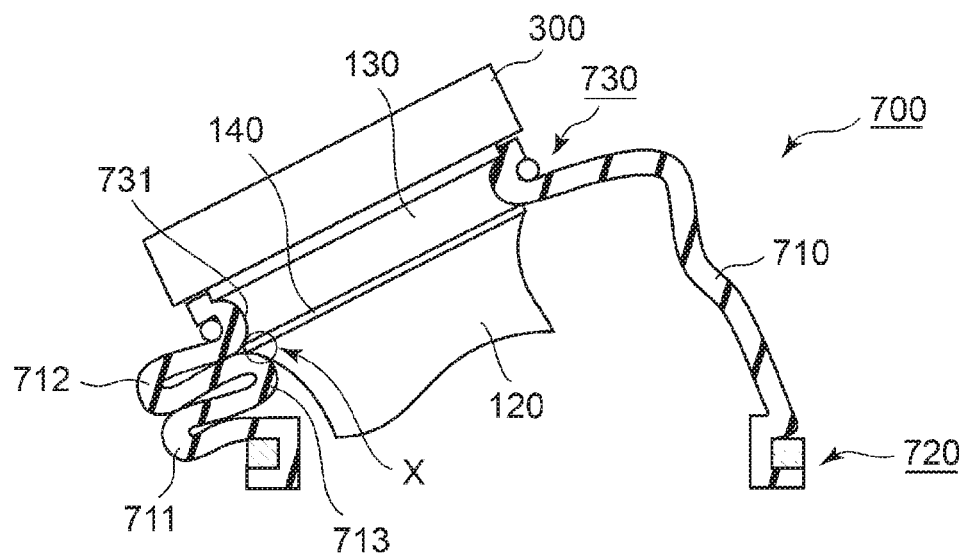
FIG. 6 is a schematic sectional view illustrating a state of the main part of the ball joint when a ball stud swings, according to the conventional example.

Referring to FIGS. 1 to 3, a ball joint and a dust cover according to an embodiment of the present invention will be described. FIG. 1 is a schematic sectional view of the ball joint according to the embodiment of the present invention. FIG. 1 illustrates a sectional view obtained by cutting the ball joint in a plane that includes the central axis of a shank portion of a ball stud included in the ball joint. FIG. 2 is a schematic sectional view of the dust cover according to the embodiment of the present invention. FIG. 2 illustrates a sectional view obtained by cutting the dust cover in a plane that includes the central axis of the annular dust cover in a state where the dust cover is not deformed. FIG. 3 is a schematic sectional view illustrating a state of the main part of the ball joint when the ball stud swings, according to the embodiment of the present invention.

<Ball Joint>

Referring particularly to FIG. 1, the ball joint according to this embodiment will be described. The ball joint includes a ball stud 100, a socket 200 supporting the ball stud 100 in such a way as to allow the ball stud 100 to rotate and swing, and a knuckle 300 as a joint member joined to a shank portion 120 of the ball stud 100. The ball stud 100 according to this embodiment includes a spherical portion 110 at one end of the shank portion 120 having a flange portion 140. A part of the shank portion 120 on the opposite side of the shank portion 120 from the spherical portion 110 with respect to the flange portion 140 is formed by an annular groove 130 having an arc-shaped section and continuously provided from the flange portion 140. The knuckle 300 is joined to the shank portion 120 on the opposite side of the shank portion 120 from the spherical portion 110 with respect to the flange portion 140.

The socket 200 includes an annular case 210, a bottom plate 230 fixed to the bottom side of the case 210, and a bearing 220 for the spherical portion 110 of the ball stud 100. The bearing 220 has a bearing surface 221 formed by a spherical surface having a radius equal to the radius of curvature of the spherical portion 110.

A dust cover 400 is used to prevent water, dust, and so on from entering a joint portion and to prevent grease from flowing out of the joint portion.

<Dust Cover>

The dust cover 400 will be described in more detail. The dust cover 400 is made of an elastic body such as rubber (e.g. chloroprene rubber). Specifically, the dust cover 400 according to this embodiment integrally includes a deformable annular bellows-shaped body portion 410 made of the elastic body, a fixed portion 420 made of the elastic body and provided on one end side of the body portion 410, and a sealing portion 430 made of the elastic body and provided on the other end side of the body portion 410. The body portion 410 integrally includes a first mountain portion 411 protruding radially outward on the fixed portion 420 side, a second mountain portion 412 protruding radially outward on the sealing portion 430 side, and a valley portion 413 provided between these mountain portions and recessed radially inward.

The fixed portion 420 is provided with an annular groove 421. By tightening a fastening member 510 into the annular groove 421, the fixed portion 420 is fixed to the case 210 of the socket 200. Various known techniques such as a spring, a band, and a circlip can be applied to the fastening member 510.

The sealing portion 430 is configured to be slidable relative to the shank portion 120 of the ball stud 100. More specifically, an annular inner peripheral sealing portion 431 protruding radially inward is provided on the inner peripheral surface side of the sealing portion 430. It is configured that the inner peripheral sealing portion 431 is in close contact with and slidable relative to the entire annular groove 130 provided on the shank portion 120 of the ball stud 100.

The sealing portion 430 according to this embodiment is further provided with a cover portion 432 that continuously covers, in an outer wall surface of the flange portion 140 of the ball stud 100, a radially outward tip end portion and a part of a portion that decreases in diameter from the tip end portion toward the spherical portion 110 side.

It is configured that a fastening member 520 that fastens the sealing portion 430 to the shank portion 120 is mounted on the outer peripheral surface side of the sealing portion 430 (see FIG. 1). More specifically, an annular groove 433 is provided on the outer peripheral surface side of the sealing portion 430. By tightening the fastening member 520 into the annular groove 433, the state where the inner peripheral surface of the sealing portion 430 is in close contact with the outer peripheral surface of the shank portion 120 is maintained. Various known techniques such as a spring, a band, and a circlip can be applied to the fastening member 520.

In the dust cover 400 configured as described above, when the ball stud 100 swings relative to the socket 200 (swings in a direction of arrow P in FIG. 1), the body portion 410 deforms. When the ball stud 100 rotates relative to the socket 200 (rotates in a direction of arrow R in FIG. 1), the sealing portion 430 slides relative to the shank portion 120 of the ball stud 100. With this configuration, even when the ball stud 100 either swings or rotates relative to the socket 200, the sealing function is exhibited by the dust cover 400.

<Advantages of Ball Joint and Dust Cover According to this Embodiment>

According to this embodiment, the radially outward tip end portion of the flange portion 140 of the ball stud 100 and a part of its portion that decreases in diameter from the tip end portion toward the spherical portion 110 side are continuously covered by the cover portion 432 provided to the sealing portion 430 of the dust cover 400. Therefore, even when the ball stud 100 swings so that the body portion 410 of the dust cover 400 is deformed, it is possible to suppress contact of the body portion 410 with the vicinity of the flange portion 140 of the ball stud 100. This point will be described more specifically with reference to FIG. 3.

For example, as illustrated in FIG. 3, when the ball stud 100 is tilted to incline to the left side in the figure, the body portion 410 deforms so that the left side in the figure is compressed and the right side in the figure is extended. Consequently, on the left side in the figure, the first mountain portion 411 and the second mountain portion 412 of the body portion 410 come in contact with each other. In this embodiment, since the radially outward tip end portion of the flange portion 140 of the ball stud 100 and a part of its portion that decreases in diameter from the tip end portion toward the spherical portion 110 side are continuously covered by the cover portion 432, a tip end of the valley portion 413 does not come in contact with the vicinity of the flange portion 140, but comes in contact with the vicinity of the cover portion 432 (see a portion indicated by arrow Y in the figure). Since the body portion 410 is made of the rubber-like elastic body and the inside is normally filled with grease, even when the portions forming the body portion 410 come in contact with each other, there is hardly a problem such as acceleration of degradation.

As described above, according to this embodiment, since it is possible to suppress contact of the body portion 410 with the vicinity of the flange portion 140 of the ball stud 100, it is possible to suppress time degradation of the body portion 410. Therefore, it is possible to improve the durability of the dust cover 400.

DESCRIPTION OF REFERENCE NUMERALS 100 ball stud
110 spherical portion
120 shank portion
130 annular groove
140 flange portion
200 socket
210 case
220 bearing
221 bearing surface
230 bottom plate
300 knuckle
400 dust cover
410 body portion
411 first mountain portion
412 second mountain portion
413 valley portion
420 fixed portion
421 annular groove
430 sealing portion
431 inner peripheral sealing portion
432 cover portion
433 annular groove
510, 520 fastening member

The invention claimed is:
1. A ball joint comprising:
a ball stud including a spherical portion at one end of a shank portion having a flange portion;
a socket having a bearing for the spherical portion and supporting the ball stud in such a way as to allow the ball stud to rotate and swing;
a joint member joined to the shank portion on an opposite side of the shank portion from the spherical portion with respect to the flange portion; and
a dust cover made of an elastic body and including:
a deformable bellows-shaped body portion;
a fixed portion, the fixed portion provided on one end side of the deformable bellows-shaped body portion and fixed to the socket; and
a sealing portion provided on the other end side of the deformable bellows-shaped body portion, the sealing portion configured to be slidable relative to the shank portion,
wherein the sealing portion includes:
an inner peripheral sealing portion configured to be slidable on a part of the shank portion on the opposite side of the shank portion from the spherical portion with respect to the flange portion; and
a cover portion that covers, in an outer wall surface of the flange portion, a radially outward tip end portion of the flange portion and a decreased diameter portion of the flange portion that decreases in diameter from the tip end portion toward the spherical portion.

2. The ball joint according to claim 1, wherein the part of the shank portion on the opposite side of the shank portion from the spherical portion with respect to the flange portion defines an annular groove having an arc-shaped section and is continuously provided from the flange portion, and the inner peripheral sealing portion is in contact with and slidable relative to the annular groove.

3. The ball joint according to claim 1, wherein the cover portion includes an inclined surface that is inclined radially inwardly in a direction from the inner peripheral sealing portion towards a free end of the cover portion.

4. A dust cover for use in a ball joint, the ball joint including:

a ball stud including a spherical portion at one end of a shank portion having a flange portion; a socket having a bearing for the spherical portion and supporting the ball stud in such a way as to allow the ball stud to rotate and swing; and a joint member joined to the shank portion on an opposite side of the shank portion from the spherical portion with respect to the flange portion, the dust cover is made of an elastic body and comprises:

a deformable bellows-shaped body portion;

a fixed portion, the fixed portion provided on one end side of the deformable bellows-shaped body portion and configured to be fixed to the socket; and a sealing portion provided on the other end side of the deformable bellows-shaped body portion, the sealing portion configured to be slidable relative to the shank portion, wherein the sealing portion includes:

an inner peripheral sealing portion configured to be slidable on a part of the shank portion on the opposite side of the shank portion from the spherical portion with respect to the flange portion; and a cover portion that is configured to cover, in an outer wall surface of the flange portion, a radially outward tip end portion of the flange portion and a decreased diameter portion of the flange portion that decreases in diameter from the tip end portion toward the spherical portion.

5. The dust cover according to claim 4, wherein the cover portion includes an inclined surface that is inclined radially inwardly in a direction from the inner peripheral sealing portion towards a free end of the cover portion.

* * * * *